(12) United States Patent
Kroener et al.

(10) Patent No.: US 10,101,967 B2
(45) Date of Patent: *Oct. 16, 2018

(54) ZERO DETECTION OF A SUM OF INPUTS WITHOUT PERFORMING AN ADDITION

(71) Applicant: International Business Machines Corporation, Armonk, NY (US)

(72) Inventors: Michael K. Kroener, Ehningen (DE); Silvia M. Mueller, Altdorf (DE); Manuela Niekisch, Gechingen (DE); Kerstin C. Schelm, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/438,831

(22) Filed: Feb. 22, 2017

(65) Prior Publication Data

US 2018/0239588 A1    Aug. 23, 2018

(51) Int. Cl.
G06F 7/00    (2006.01)
G06F 7/575    (2006.01)

(52) U.S. Cl.
CPC .................................. G06F 7/575 (2013.01)

(58) Field of Classification Search
CPC ...................................................... G06F 7/575
USPC ....................................................... 708/525
See application file for complete search history.

(56) References Cited

U.S. PATENT DOCUMENTS

| | | | | |
|---|---|---|---|---|
| 5,020,016 A * | 5/1991 | Nakano | ..................... | G06F 7/50 708/525 |
| 5,367,477 A * | 11/1994 | Hinds | ..................... | G06F 7/02 708/525 |
| 5,581,496 A * | 12/1996 | Lai | ..................... | G06F 7/02 708/525 |
| 5,798,958 A * | 8/1998 | Wong | ..................... | G06F 7/026 708/670 |
| 6,424,955 B1 * | 7/2002 | Wong | ..................... | G06F 7/02 708/525 |
| 8,015,230 B2 | 9/2011 | Tam | | |
| 8,578,196 B2 | 11/2013 | Barowski et al. | | |

(Continued)

OTHER PUBLICATIONS

Lutz et al., "Early Zero Detection ," 1996 IEEE International Conference on Computer Design: VLSI in Computers and Processors, Oct. 7-9, 1996, © 1996 IEEE, pp. 545-550.

(Continued)

*Primary Examiner* — Tan V. Mai
(74) *Attorney, Agent, or Firm* — Edward P. Li

(57) ABSTRACT

A logic circuit and a method using thereof for zero detection of a sum of inputs without performing an addition. The logic circuit and the method using thereof perform a true mathematical zero check and a zero check for trailing N-bits. The logic circuit and the method using thereof include bitwise XOR, XNOR, and OR operations, an OR-reduction, an AND reduction, and a control signal that switches between a true mathematical zero check and a zero check for trailing N-bits. The logic circuit and the method using thereof have less timing delay than an adder or a leading zero anticipator for a zero check. The logic circuit and the method using thereof use less logic gates and therefore less area and less power are needed. The logic circuit and the method using thereof have a great advantage for the zero check of large input vectors.

13 Claims, 6 Drawing Sheets

(56) References Cited

U.S. PATENT DOCUMENTS

2013/0262546 A1    10/2013    Shinomiya et al.
2014/0351308 A1    11/2014    Tannenbaum et al.

OTHER PUBLICATIONS

Weinberger, Arnold, "High-Speed Zero-Sum Detection," Proceedings of the 3rd IEEE Symposium on Computer Arithmetic, Southern Methodist University, Dallas, Texas, Nov. 19-20, 1975, pp. 200-207.
Appendix P List of IBM Patents or Applications Treated as Related Dated Oct. 20, 2017. Two pages.
Kroener et al. Original U.S. Appl. No. 15/788,901, filed Oct. 20, 2017.

\* cited by examiner

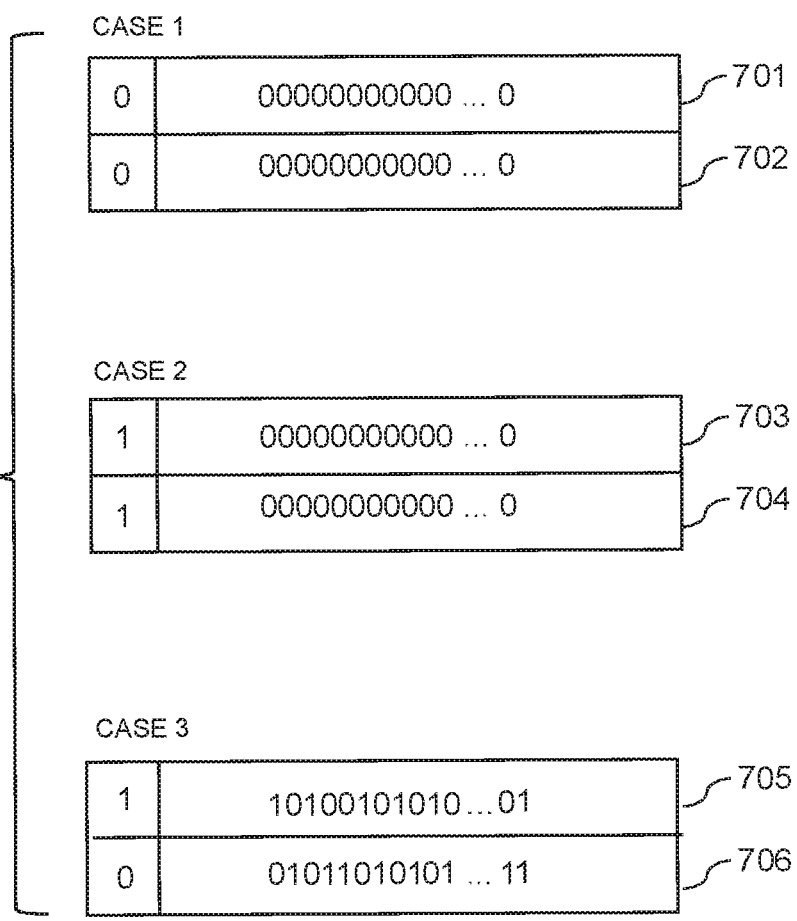

ZERO DETECTION OF A SUM OF INPUTS WITHOUT PERFORMING AN ADDITION

BACKGROUND

The present invention relates generally to a logic circuit for zero detection, and more particularly to a logic circuit for detecting a zero result of an addition without performing the addition for two vectors containing signed integer values.

The SRT algorithm is a square root algorithm named after its originators, Sweeney, Robertson and Tocher. A hardware SRT implementation of a divide and square root algorithm uses a redundant data format to perform the inner loop of the algorithm. The partial remainder of the iteration is represented in two vectors of a length N containing signed integer numbers in the 2's complement representation. N is defined by the precision of the operands. The information whether the remainder is zero or not is needed for the rounding step of the operation.

The problem of fast detection whether two numbers sum to zero is not unique to SRT engines. It occurs in several corners of floating-point unit design; for example, in the exponent logic when checking for corner cases like overflow and underflow.

One known solution of the zero check is to use an adder. This method adds two input vectors and checks the result for any non-zero bit. The logic depth of such an implementation is 2*log(n)+3 without the or-reduction. The drawbacks of the method include additional hardware of an N-bit adder, the deeper logic tree to compute the result, and more power consumption.

Another known solution of the zero check is to use a leading zero anticipator with an additional compare of the result of the leading zero anticipator. The zero check using a leading zero anticipator uses two input vectors, performs the leading zero anticipation without adding the two vectors, and compares the result against the number of bits of the vectors. The logic depth of this implementation is between log(n)+7 and 1.5*log(n)+5. The drawbacks of the method include the additional leading zero anticipator, the deeper logic tree to compute the result, and more power consumption.

SUMMARY

A logic circuit for zero detection of a sum of inputs without performing an addition comprises first one or more XOR gates performing a bitwise XOR operation for a first vector as a first input and a second vector as a second input, wherein the bitwise XOR operation for the first vector and the second vector generates a third vector, wherein the first vector and the second vector are signed N-bit 2's complement vectors. The logic circuit further comprises first one or more OR gates performing a bitwise OR operation for the first vector and the second vector, wherein the bitwise OR operation generates a fourth vector. The logic circuit further comprises second one or more XOR gates performing a bitwise XOR operation for the third vector and the fourth vector, wherein bit positions of the fourth vector are shifted by one bit to the left and the right end bit of the fourth vector is padded with a zero, wherein the bitwise XOR operation for the third vector and the fourth vector generates a fifth vector. The logic circuit further comprises a third XOR gate performing an XOR operation of a sign extension bit of the third vector and a sign extension bit of the fourth vector. The logic circuit further comprises a first AND gate performing an AND operation of a control signal and an output of the third XOR gate, wherein the control signal switches between a true mathematical zero check and a zero check for trailing N-bits.

A logic circuit for zero detection of a sum of inputs without performing an addition comprises first one or more XOR gates performing a bitwise XOR operation for a first vector as a first input and a second vector as a second input, wherein the bitwise XOR operation for the first vector and the second vector generates a third vector, wherein the first vector and the second vector are signed N-bit 2's complement vectors. The logic circuit further comprises first one or more OR gates performing a bitwise OR operation for the first vector and the second vector, wherein the bitwise OR operation generates a fourth vector. The logic circuit further comprises one or more XNOR gates performing a bitwise XNOR operation for the third vector and the fourth vector, wherein bit positions of the fourth vector are shifted by one bit to the left and the right end bit of the fourth vector is padded with a zero, wherein the bitwise XNOR operation for the third vector and the fourth vector generates a fifth vector. The logic circuit further comprises a second XOR gate performing an XOR operation of a sign extension bit of the third vector and a sign extension bit of the fourth vector. The logic circuit further comprises a first AND gate performing an AND operation of a control signal and an output of the second XOR gate, wherein the control signal switches between a true mathematical zero check and a zero check for trailing N-bits.

A method for zero detection of a sum of inputs without performing an addition is provided. The method comprises performing, by first one or more XOR gates in a logic circuit, a bitwise XOR operation for a first vector as a first input and a second vector as a second input, wherein the bitwise XOR operation for the first vector and the second vector generates a third vector, wherein the first vector and the second vector are signed N-bit 2's complement vectors. The method further comprises performing, by first one or more OR gates in the logic circuit, a bitwise OR operation for the first vector and the second vector, wherein the bitwise OR operation generates a fourth vector. The method further comprises performing, by second one or more XOR gates in the logic circuit, a bitwise XOR operation for the third vector and the fourth vector, wherein bit positions of the fourth vector are shifted by one bit to the left and the right end bit of the fourth vector is padded with a zero, wherein the bitwise XOR operation for the third vector and the fourth vector generates a fifth vector. The method further comprises performing, by a third XOR gate in the logic circuit, an XOR operation of a sign extension bit of the third vector and a sign extension bit of the fourth vector. The method further comprises performing, by a first AND gate in the logic circuit, an AND operation of a control signal and an output of the third XOR gate, wherein the control signal switches between a true mathematical zero check and a zero check for trailing N-bits.

A method for zero detection of a sum of inputs without performing an addition is provided. The method comprises performing, by first one or more XOR gates in a logic circuit, a bitwise XOR operation for a first vector as a first input and a second vector as a second input, wherein the bitwise XOR operation for the first vector and the second vector generates a third vector, wherein the first vector and the second vector are signed N-bit 2's complement vectors. The method further comprises performing, by first one or more OR gates in the logic circuit, a bitwise OR operation for the first vector and the second vector, wherein the bitwise OR operation generates a fourth vector. The method further comprises performing, by one or more XNOR gates in the logic circuit, a bitwise XNOR operation for the third vector and the fourth vector, wherein bit positions of the fourth vector are shifted by one bit to the left and the right end bit of the fourth vector is padded with a zero, wherein the bitwise XNOR operation for the third vector and the fourth vector generates a fifth vector. The method further comprises performing, by a second XOR gate in the logic circuit, an XOR operation of a sign extension bit of the third vector and a sign extension bit of the fourth vector. The method further comprises performing, by a first AND gate in the logic circuit, an AND operation of a control signal and an output of the second XOR gate, wherein the control signal switches between a true mathematical zero check and a zero check for trailing N-bits.

BRIEF DESCRIPTION OF THE SEVERAL VIEWS OF THE DRAWINGS

FIG. 7 is a diagram illustrating three corner cases of the structures of two input vectors which lead to a zero result, in accordance with one embodiment of the present invention.

DETAILED DESCRIPTION

Embodiments of the present invention take advantage of the fact that two vectors must have a special structure if an addition leads to a zero result. Embodiments of the present invention describe how this special structure can be detected without using an addition or a leading zero anticipator. The mechanism can also be used in other implementations where a timing critical zero detect of the result of an addition of two vectors in the 2's complement representation is needed. The logic depth of the implementation of zero detection in the present invention is 3+OR-reduction, compared to 2*log(n)+3+or-reduction for the zero check using an adder and log(n)+7 to 1.5*log(n)+5 for the zero check using a leading zero anticipator. The advantages of implementation of the zero detection in the present invention are as follows. The implementation in the present invention has less timing delay than the zero check using an adder and the zero check using a leading zero anticipator. The implementation in the present invention uses less logic gates and therefore less area and less power are needed. The implementation in the present invention has a great advantage for the zero check of large input vectors.

For signed N-bit 2's complement vectors A and B, there are basically two types of zero checks. The first type is a true mathematical zero check, i.e., the numbers A and B mathematically add to zero. The operands get sign-extended prior to the addition; therefore, the sum exceeds the N-bit target width:

$$S(0{:}N){=}A(0{,}0{:}N{-}1){+}B(0{,}0{:}N{-}1){\rightarrow}\text{zero}{=}(S(0{:}N){=}{=}0)$$

An example of the first type is the zero check in the exponent calculation of floating-point units.

The second type is a zero check for trailing N bits. In the second type, A and B add to zero in the given target width.

$$S(0{:}N{-}1){=}A(0{,}0{:}N{-}1){+}B(0{,}0{:}N{-}1){\rightarrow}\text{zero}{=}(S(0{:}N{-}1){=}{=}0)$$

The difference from the first type is that the sum is considered zero when its trailing N bits are zero. The overflowing case which maps to zero is A=B=10 . . . 0. This type of the zero check is used in the divide and square root algorithm.

Figure 1:
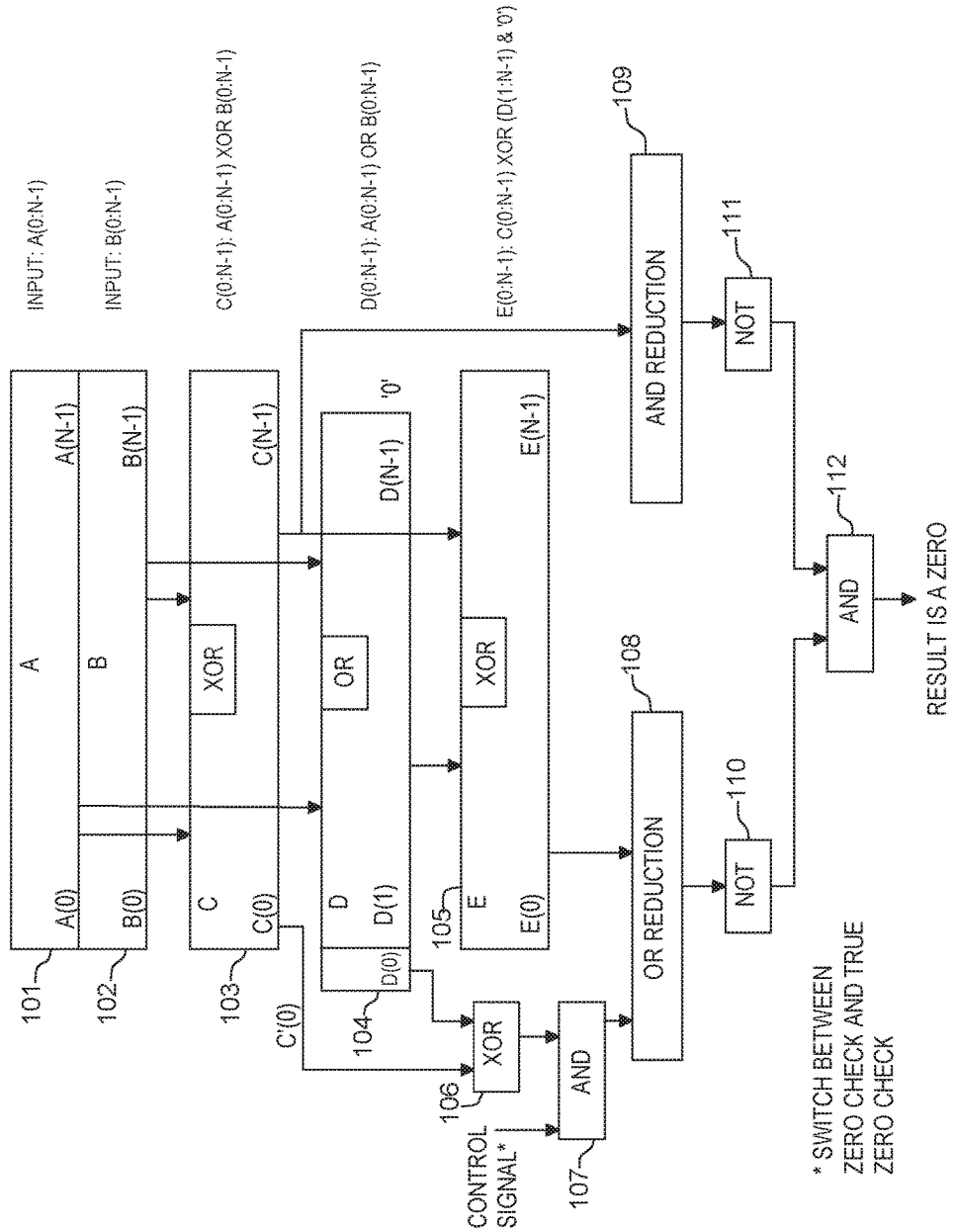
FIG. 1 is a diagram illustrating implementation of zero detection of a sum of inputs without performing an addition, in accordance with a first embodiment of the present invention.
Figures 5, 6:
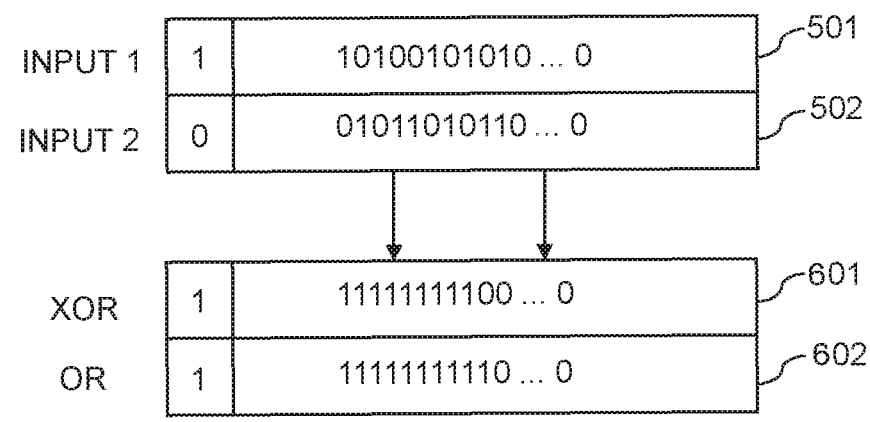
FIG. 5 is a diagram illustrating an example of a vector pair leading to a zero result, in accordance with one embodiment of the present invention.
FIG. 6 is a diagram illustrating an example of the result of an XOR operation and an OR operation of the two vectors shown in FIG. 5, in accordance with one embodiment of the present invention.

FIG. 1 is a diagram illustrating implementation of zero detection of a sum of inputs without performing an addition, in accordance with a first embodiment of the present invention. Block 101 and 102 represent two vectors of a length N containing signed integer numbers in the 2's complement representation. Block 101 is a first vector of a length N containing signed integer numbers in the 2's complement representation—A(0:N−1), and block 102 is a second vector of a length N containing signed integer numbers in the 2's complement representation—B(0:N−1). FIG. 5 illustrates an example of two input vectors (501 and 502) leading to a zero result, in accordance with one embodiment of the present invention. The invention takes advantage of the fact that the two input vectors must have a special structure if the result of their addition is zero. The two input vectors are either both zero or must be of different sign. Furthermore, the two input vectors must contain a series of '0'/'1' pairs followed by a '1'/'1' pair followed by '0'/'0' pairs.

Referring to FIG. 1, as shown by block 103, a bitwise XOR operation of the two input vectors (A(0:N−1) and B(0:N−1)) results in vector C.

$$C(0{:}N{-}1){:}A(0{,}N{-}1) \text{ XOR } B(0{,}N{-}1)$$

The bitwise XOR operation of the two input vectors (A(0:N−1) and B(0:N−1)) is implemented by one or more XOR gates in a circuit. As shown by block 104, a bitwise OR operation of the two input vectors (A(0:N−1) and B(0:N−1)) results in vector D.

$$D(0{:}N{-}1){:}A(0{,}N{-}1) \text{ OR } B(0{,}N{-}1)$$

The bitwise OR operation of the two input vectors (A(0:N−1) and B(0:N−1)) is implemented by one or more OR gates in a circuit. FIG. 6 is illustrates an example of the result of the bitwise XOR operation and the bitwise OR operation of vectors 501 and 502, in accordance with one embodiment of the present invention. In the example of FIG. 6, the bitwise XOR operation and the bitwise OR operation of the two input vectors with the special structure lead to vector 601 and vector 602, respectively. Both vectors 601 and 602 contain ones in the most significant bits and zeros in the least significant bits. The difference is in the bit position of the '1'/'1' pair; vector 602 (which is the result of the bitwise OR operation of vectors 501 and 502) contains a '1' in this bit position and vector 601 (which is the result of the bitwise XOR operation of vectors 501 and 502) contains a '0'. Shown in the example of FIG. 6, when bit positions of vector 502 are shifted by one bit to the left, a bitwise XOR operation of vector 601 and vector 602 will lead to a vector containing all zeros.

Referring to FIG. 1, bit positions of vector D are shifted by one bit to the left. The right end bit of vector D is padded by '0'. A bitwise XOR operation is operated for two vectors; the first vector is vector C from 0th bit to (N−1)th bit, and the second vector is vector D from the 1st bit to (N−1)th bit plus the padded '0'. The bitwise XOR operation of the two vectors is implemented by one or more XOR gates in a circuit. As shown by block 105, the bitwise XOR operation results in vector E.

$$E(0{:}N{-}1){:}C(0{,}N{-}1) \text{ XOR } [D(1{,}N{-}1)\&\text{'0'}]$$

Referring to FIG. 1, as shown by block 106, an XOR operation is performed for C'(0) and D(0). The XOR reduction is implemented by an XOR gate in a circuit. C'(0) is the sign extension of vector C. C'(0:N)=C(0, 0:N−1). As mentioned in the previous paragraph, bit positions of vector D are shifted by one bit to the left and the right end bit of vector D is padded by '0'. Then, as shown by block 107, an AND operation is performed for the output of the XOR operation shown by block 106 and a control signal. The control signal switches between the first type of zero check and the second type of zero check. When the control signal is one, the true mathematical zero check (the first type of zero check) is enabled; when the control signal is zero, the true mathematical zero check is disabled.

Referring to FIG. 1, as shown by block 108, an OR reduction is performed for vector E and an output of the AND operation shown by block 107. The OR reduction is implemented by an OR gate in a circuit. The OR reduction operates on all the bits of vector E and the output of the AND operation shown by block 107, and the OR reduction returns a single-bit value. Then, the single-bit value is through an inverter as shown by block 110.

Referring to FIG. 1, as shown by block 109, an AND reduction is performed for vector C. The AND reduction is implemented by an AND gate in a circuit. The AND reduction operates on all the bits of vector C and returns a single-bit value. Then, the single-bit value is through an inverter as shown by block 111.

Referring to FIG. 1, shown by block 112, an AND operation is performed for an output of the inverter shown by block 110 and an output of the inverter shown by block 111. The AND operation is implemented by an AND gate in a circuit. If both outputs of the inverters are 1, the output of the AND gate shown by block 112 will be 1; therefore, the sum of vectors A and B is a zero. When the control signal enable the true mathematical zero check, a true mathematical zero of the sum of vectors A and B is detected; when the control signal disable the true zero check, the trailing bits of the sum of vectors A and B are detected.

Figure 2:
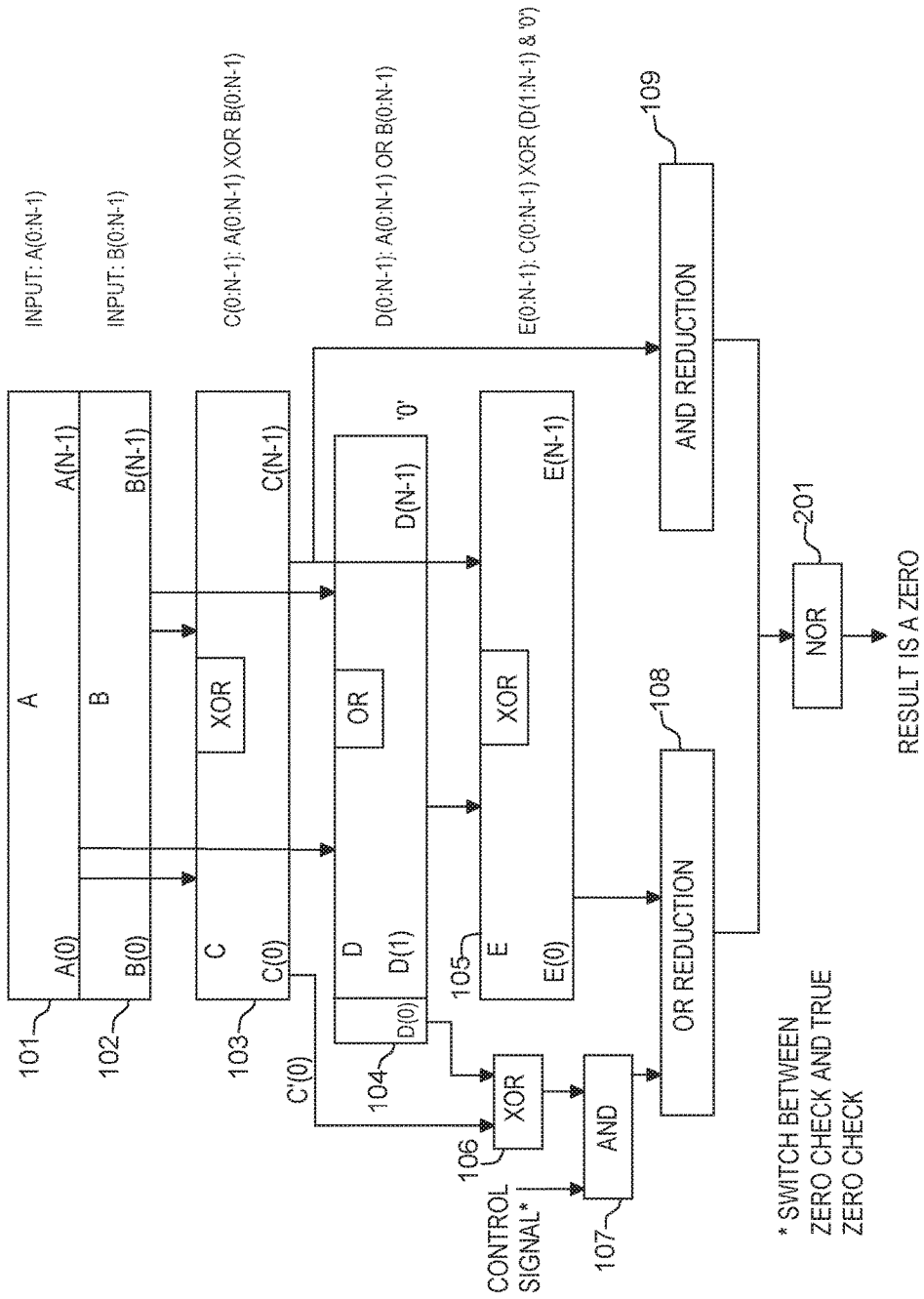
FIG. 2 is a diagram illustrating implementation of zero detection of a sum of inputs without performing an addition, in accordance with a second embodiment of the present invention.

FIG. 2 is a diagram illustrating implementation of zero detection of a sum of inputs without performing an addition, in accordance with a second embodiment of the present invention. The operations represented by blocks 101, 102, 103, 104, 105, 106, 107, 108, and 109 in FIG. 2 are the same as in FIG. 1. The operations of these blocks have been discussed in previous paragraphs with reference to FIG. 1.

Referring to FIG. 2, the OR reduction (block 108) operates on all the bits of vector E and the output of the AND operation shown by block 107, and the OR operation returns a first single-bit value. The AND reduction (block 109) operates on all the bits of vector C and returns a second single-bit value. As shown by block 201, a NOR operation is performed for the first single-bit value and the second single-bit value. The NOR operation is implemented by an NOR gate in a circuit. If the output of the NOR gate shown by block 201 is 1, then the sum of vectors A and B is a zero. When the control signal enable the true mathematical zero check, a true mathematical zero of the sum of vectors A and B is detected; when the control signal disable the true zero check, the trailing bits of the sum of vectors A and B are detected.

Figure 3:
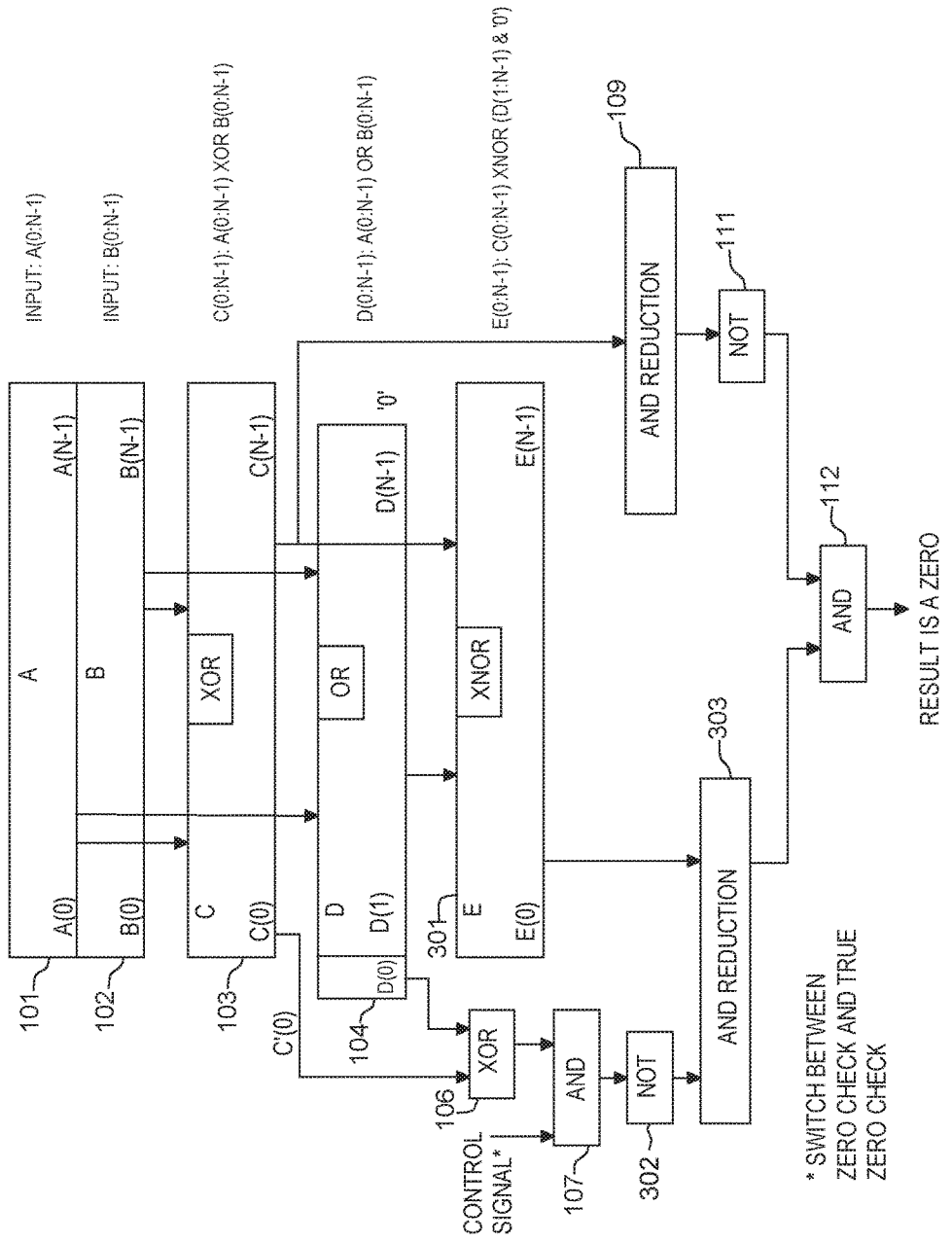
FIG. 3 is a diagram illustrating implementation of zero detection of a sum of inputs without performing an addition, in accordance with a third embodiment of the present invention.

FIG. 3 is a diagram illustrating implementation of zero detection of a sum of inputs without performing an addition, in accordance with a third embodiment of the present invention. The operations represented by blocks 101, 102, 103, 104, 106, 107, and 109 in FIG. 3 are the same as in FIG. 1. The operations of these blocks have been discussed in previous paragraphs with reference to FIG. 1.

Referring to FIG. 3, a bitwise XNOR operation (block 301) is operated for two vectors; the first vector is vector C from 0th bit to (N−1)th bit, and the second vector is vector D from the 1st bit to (N−1)th bit plus the padded '0'. The bitwise XNOR operation of the two vectors is implemented by one or more XNOR gates in a circuit. As shown by block 301, the bitwise XNOR operation results in vector E.

$$E(0{:}N{-}1){:}C(0{,}N{-}1) \text{ XNOR } [D(1{,}N{-}1)\&\text{'0'}]$$

Referring to FIG. 3, an inverter shown by block 302 follows the AND operation shown by block 107. As shown by block 303, an AND reduction is performed for vector E and an output of the inverter shown by block 302. The AND reduction is implemented by an AND gate in a circuit. The AND reduction operates on all the bits of vector E and the output of the inverter shown by block 302, and the AND reduction returns a single-bit value. Then, the single-bit value is an input of an AND operation performed by an AND gate shown by block 112.

In another embodiment, referring to FIG. 3, the AND reduction shown by block 109 and the inverter shown by block 111 can be replaced by one or more inverters followed by an OR reduction. The one or more inverters invert vector C.

Figure 4:
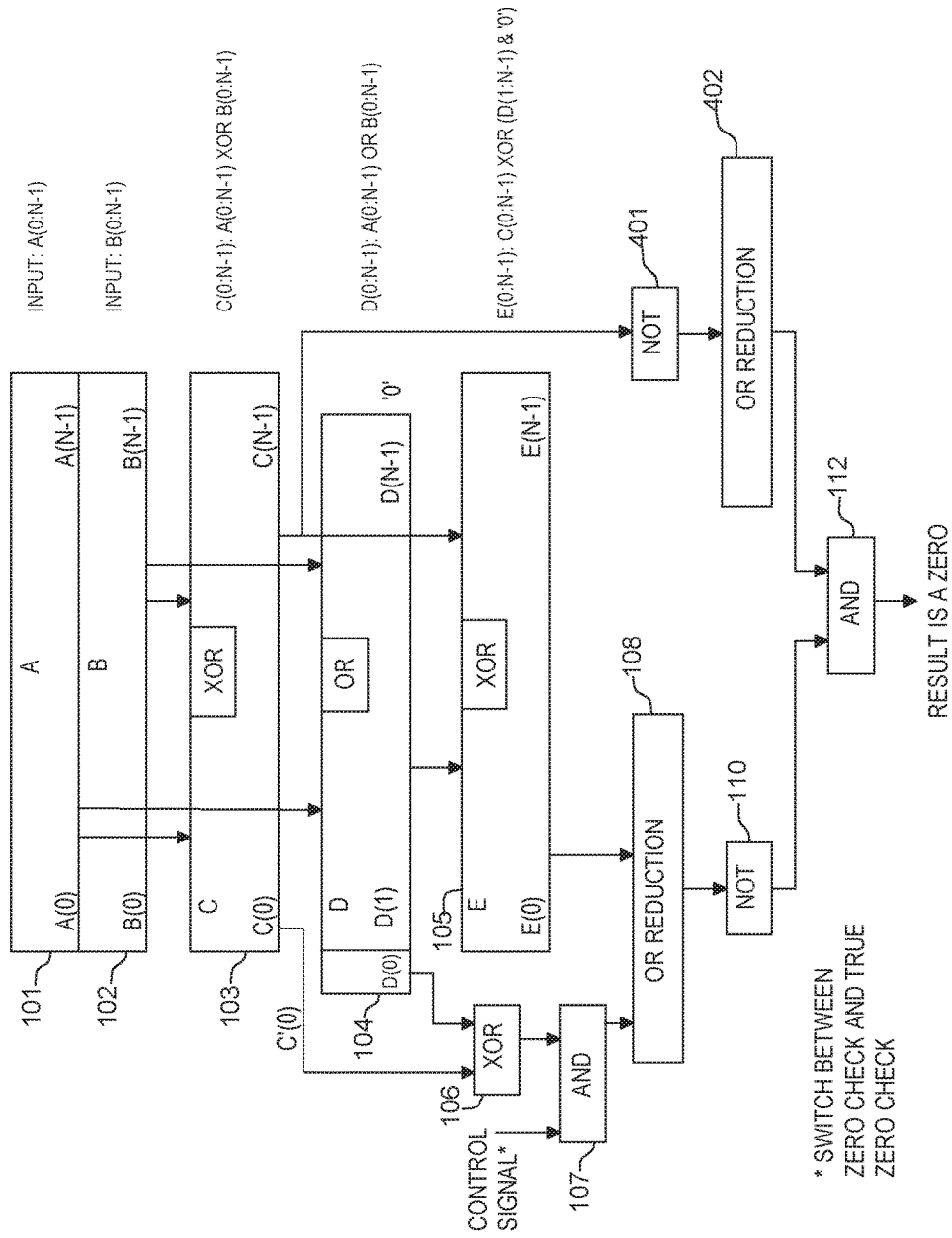
FIG. 4 is a diagram illustrating implementation of zero detection of a sum of inputs without performing an addition, in accordance with a fourth embodiment of the present invention.

FIG. 4 is a diagram illustrating implementation of zero detection of a sum of inputs without performing an addition, in accordance with a fourth embodiment of the present invention. The operations represented by blocks 101, 102, 103, 104, 105, 106, 107, 108, 110, and 112 in FIG. 4 are the same as in FIG. 1. The operations of these blocks have been discussed in previous paragraphs with reference to FIG. 1.

Referring to FIG. 4, a NOT operation is performed for vector C. The NOT operation is implemented by one or more inverters shown by block 401 in a circuit. As shown by block 402, an OR reduction operates on all the bits of outputs of the one or more inverters shown by block 401 and returns a single-bit value. The OR reduction is implemented by an OR gate in a circuit. Then, the single-bit value is an input of an AND operation performed by an AND gate shown by block 112.

In yet another embodiment, the OR reduction operation shown by block 108 followed by the inverter shown by block 110 in FIG. 1 can be replaced by inverters followed by an AND reduction operation. The inverters include an inverter following the AND gate shown by block 107 and one or more inverters following the XOR operation shown by block 105. The one or more inverters invert vector E.

FIG. 7 is a diagram illustrating three corner cases of the structures of two input vectors which lead to a zero result, in accordance with one embodiment of the present invention. There are 3 corner cases. In case 1, both input vectors 701 and 702 contain only zeros. In case 2, both input vectors 703 and 704 contain a negative sign followed by all zeros. In case 3, the '1'/'1' pair is in the least significant bit position of input vectors 705 and 706. All the three corner cases are covered by the invention.

Based on the foregoing, a method and a logic circuit have been disclosed for detecting a zero result of an addition of two vectors without performing the addition. However, numerous modifications and substitutions can be made without deviating from the sprit and scope of the present invention. Therefore, the present invention has been disclosed by way of examples and not limitation.

What is claimed is:

1. A logic circuit for zero detection of a sum of inputs without performing an addition, the logic circuit comprising:
   first one or more XOR gates performing a bitwise XOR operation for a first vector as a first input and a second vector as a second input, wherein the bitwise XOR operation for the first vector and the second vector generates a third vector, wherein the first vector and the second vector are signed N-bit 2's complement vectors;
   first one or more OR gates performing a bitwise OR operation for the first vector and the second vector, wherein the bitwise OR operation generates a fourth vector;
   second one or more XOR gates performing a bitwise XOR operation for the third vector and the fourth vector, wherein bit positions of the fourth vector are shifted by one bit to the left and the right end bit of the fourth vector is padded with a zero, wherein the bitwise XOR operation for the third vector and the fourth vector generates a fifth vector;
   a third XOR gate performing an XOR operation of a sign extension bit of the third vector and a sign extension bit of the fourth vector; and
   a first AND gate performing an AND operation of a control signal and an output of the third XOR gate, wherein the control signal switches between a true mathematical zero check and a zero check for trailing N-bits.

2. The logic circuit of claim 1, further comprising:
   a second OR gate performing OR reduction of the fifth vector and an output of the first AND gate;
   a second AND gate performing AND reduction of the third vector;
   a first inverter inverting an output of the second OR gate;
   a second inverter inverting an output of the second AND gate; and
   a third AND gate performing an AND operation of an output of the first inverter and an output of the second inverter;
   wherein a sum of the first input and the second input is a zero if an output of the third AND gate is one.

3. The logic circuit of claim 1, further comprising:
   a second OR gate performing OR reduction of the fifth vector and an output of the first AND gate;
   a second AND gate performing AND reduction of the third vector; and
   a NOR gate performing a NOR operation of an output of the second OR gate and an output of the second AND gate;
   wherein a sum of the first input and the second input is a zero if an output of the NOR gate is one.

4. The logic circuit of claim 1, further comprising:
   a second OR gate performing OR reduction of the fifth vector and an output of the first AND gate;
   a first inverter inverting an output of the second OR gate;
   second one or more inverters inverting the third vector;
   a third OR gate performing OR reduction of outputs of the second one or more inverters; and
   a second AND gate performing an AND operation of an output of the first inverter and an output of the third OR gate;
   wherein a sum of the first input and the second input is a zero if an output of the second AND gate is one.

5. The logic circuit of claim 1, further comprising:
   a first inverter inverting an output of the first AND gate;
   second one or more inverters inverting the fifth vector;
   a second AND gate performing AND reduction of an output of the first inverter and outputs of the second one or more inverters;
   a third AND gate performing AND reduction of the third vector;
   a third inverter inverting an output of the third AND gate; and
   a fourth AND gate performing an AND operation of an output of the third inverter and an output of the second AND gate;
   wherein a sum of the first input and the second input is a zero if an output of the fourth AND gate is one.

6. The logic circuit of claim 1, further comprising:
   a first inverter inverting an output of the first AND gate;
   second one or more inverters inverting the fifth vector;
   a second AND gate performing AND reduction of an output of the first inverter and outputs of the second one or more inverters;
   third one or more inverters inverting the third vector;
   a second OR gate performing OR reduction of outputs of the third one or more inverters; and
   a third AND gate performing an AND operation of an output of the second OR gate and an output of the second AND gate;
   wherein a sum of the first input and the second input is a zero if an output of the third AND gate is one.

7. The logic circuit of claim 1, wherein it is detected whether a sum of the first input and the second input is a true mathematical zero if the control signal enables the true mathematical zero check.

8. The logic circuit of claim 1, wherein it is detected whether trailing bits of a sum of the first input and the second input are zeros if the control signal disables the true mathematical zero check.

9. A logic circuit for zero detection of a sum of inputs without performing an addition, the logic circuit comprising:
   first one or more XOR gates performing a bitwise XOR operation for a first vector as a first input and a second vector as a second input, wherein the bitwise XOR operation for the first vector and the second vector generates a third vector, wherein the first vector and the second vector are signed N-bit 2's complement vectors;
   first one or more OR gates performing a bitwise OR operation for the first vector and the second vector, wherein the bitwise OR operation generates a fourth vector;
   one or more XNOR gates performing a bitwise XNOR operation for the third vector and the fourth vector, wherein bit positions of the fourth vector are shifted by one bit to the left and the right end bit of the fourth vector is padded with a zero, wherein the bitwise XNOR operation for the third vector and the fourth vector generates a fifth vector;
   a second XOR gate performing an XOR operation of a sign extension bit of the third vector and a sign extension bit of the fourth vector; and a first AND gate performing an AND operation of a control signal and an output of the second XOR gate, wherein the control signal switches between a true mathematical zero check and a zero check for trailing N-bits.

10. The logic circuit of claim 9, further comprising:

a first inverter inverting an output of the first AND gate;

a second AND gate performing AND reduction of an output of the first inverter and the fifth vector;

a third AND gate performing AND reduction of the third vector;

a second inverter inverting an output of the third AND gate; and a fourth AND gate performing an AND operation of an output of the second inverter and an output of the second AND gate;

wherein a sum of the first input and the second input is a zero if an output of the fourth AND gate is one.

11. The logic circuit of claim 9, further comprising:

a first inverter inverting an output of the first AND gate;

a second AND gate performing AND reduction of an output of the first inverter and the fifth vector;

second one or more inverters inverting the third vector;

a second OR gate performing OR reduction of outputs of the second one or more inverters; and a third AND gate performing an AND operation of an output of the second AND gate and an output of the second OR gate;

wherein a sum of the first input and the second input is a zero if an output of the third AND gate is one.

12. The logic circuit of claim 9, wherein it is detected whether a sum of the first input and the second input is a true mathematical zero if the control signal enables the true mathematical zero check.

13. The logic circuit of claim 9, wherein it is detected whether trailing bits of a sum of the first input and the second input are zeros if the control signal disables the true mathematical zero check.

\* \* \* \* \*